United States Patent
Allen

(10) Patent No.: US 10,940,985 B2
(45) Date of Patent: Mar. 9, 2021

(54) WRAPPING WEB ASSEMBLY AND WRAPPING METHOD

(71) Applicant: Tama Group, Kibbutz Mishmar Ha'Emek (IL)

(72) Inventor: Samuel Lance Allen, South Melbourne (AU)

(73) Assignee: Tama Plastic Industry

( * ) Notice: Subject to any disclaimer, the term of this patent is extended or adjusted under 35 U.S.C. 154(b) by 278 days.

(21) Appl. No.: 14/907,683

(22) PCT Filed: Nov. 25, 2013

(86) PCT No.: PCT/AU2013/001352
§ 371 (c)(1),
(2) Date: Jan. 26, 2016

(87) PCT Pub. No.: WO2015/010151
PCT Pub. Date: Jan. 29, 2015

(65) Prior Publication Data
US 2016/0177135 A1    Jun. 23, 2016

(30) Foreign Application Priority Data
Jul. 26, 2013 (AU) ................................ 2013902776

(51) Int. Cl.
*C09J 7/40* (2018.01)
*C08J 5/12* (2006.01)
(Continued)

(52) U.S. Cl.
CPC ............ *B65D 65/14* (2013.01); *B65H 18/28* (2013.01); *C08J 5/124* (2013.01); *C08J 5/18* (2013.01);
(Continued)

(58) Field of Classification Search
CPC ... C09J 7/0207; C09J 7/38; C09J 7/401; C09J 7/29; C09J 2201/128; C09J 2201/28;
(Continued)

(56) References Cited

U.S. PATENT DOCUMENTS

| 1,231,382 A | 6/1917 | Knee |
| 2,726,222 A | 12/1955 | Palmquist et al. |

(Continued)

FOREIGN PATENT DOCUMENTS

| AU | 2003292463 A1 | 7/2004 |
| AU | 2005300259 A1 | 5/2006 |

(Continued)

OTHER PUBLICATIONS

Avery-Dennison Corporation (Pressure Sensitive-Adhesives); 2011.*
(Continued)

*Primary Examiner* — Michael N Orlando
*Assistant Examiner* — Christian Roldan
(74) *Attorney, Agent, or Firm* — Lerner, David, Littenberg, Krumholz & Mentlik, LLP

(57) ABSTRACT

There is provided a wrapping web (11) having transverse tape assemblies (12) released from a double sided release film (13) and cut to length. The tape assemblies (12) comprise a double sided adhesive tape portion (14) adhered to the baling web (11) and an adhesive tape laminate portion (15) having a release surface overlying the double sided adhesive tape portion (14). The exposed adhesive layer (17) of the adhesive tape (15) permanently adheres to the back surface (24) of the web (11) as it is rolled up. The wrapping web assembly (10) is deployed by unwinding from an accumulator spool into a baling assembly. As the web (11) unspools from the accumulator spool, peel forces are applied to the tape assembly (12) causing separation of the adhesive (14) and double sided adhesive (15) tape portions. This
(Continued)

presents an exposed adhesive layer (20) whereby the web (11) can be closed over itself to close the wrapping of a product such as cotton.

15 Claims, 2 Drawing Sheets

(51) Int. Cl.
  *B65D 65/14* (2006.01)
  *B65H 18/28* (2006.01)
  *C09J 7/38* (2018.01)
  *C08J 5/18* (2006.01)

(52) U.S. Cl.
  CPC ............... *C09J 7/38* (2018.01); *C09J 7/401* (2018.01); *B65H 2301/4124* (2013.01); *B65H 2701/1944* (2013.01); *C08J 2323/06* (2013.01); *C09J 2301/124* (2020.08); *C09J 2301/18* (2020.08); *C09J 2301/204* (2020.08); *C09J 2301/302* (2020.08); *C09J 2423/046* (2013.01); *C09J 2483/005* (2013.01)

(58) Field of Classification Search
  CPC .............. C09J 2201/20; C09J 2483/005; C09J 2201/606; C09J 2423/046; B65H 18/28; B65H 2701/1944; B65H 2301/4124; C08J 5/18; C08J 5/124; C08J 2323/06; B65D 65/14
  USPC ........................................................ 156/250
  See application file for complete search history.

(56) References Cited

U.S. PATENT DOCUMENTS

| | | | |
|---|---|---|---|
| 3,053,722 A | 9/1962 | Petty | |
| 3,072,512 A | 1/1963 | Dalle | |
| 3,150,029 A | 9/1964 | Ferrand | |
| 3,162,393 A | 12/1964 | Gelleke | |
| 3,349,765 A | 10/1967 | Blanford | |
| 3,369,766 A | 2/1968 | Herman | |
| 3,457,919 A | 7/1969 | Harbard | |
| 3,735,865 A | 5/1973 | Smith | |
| 3,746,607 A | 7/1973 | Harmon et al. | |
| 3,942,713 A | 3/1976 | Olson et al. | |
| 4,041,201 A | 8/1977 | Wurker | |
| 4,050,121 A | 9/1977 | Richman | |
| 4,127,132 A | 11/1978 | Karami | |
| 4,201,352 A | 5/1980 | Madachy | |
| 4,258,846 A | 3/1981 | Campo | |
| 4,338,084 A | 7/1982 | Berthelseh | |
| 4,343,132 A | 8/1982 | Lawless, Jr. | |
| 4,349,163 A | 9/1982 | Wise | |
| 4,416,392 A | 11/1983 | Smith | |
| 4,605,577 A | 8/1986 | Bowytz | |
| 4,688,368 A | 8/1987 | Honegger | |
| 4,768,810 A | 9/1988 | Mertens | |
| 4,778,701 A | 10/1988 | Pape et al. | |
| 4,801,480 A | 1/1989 | Panza et al. | |
| 4,917,928 A | 4/1990 | Heinecke | |
| 4,941,882 A | 7/1990 | Ward et al. | |
| 5,057,097 A | 10/1991 | Gesp | |
| 5,080,254 A | 1/1992 | Feer | |
| 5,221,393 A | 6/1993 | Heutschi | |
| 5,234,517 A | 8/1993 | Pape et al. | |
| 5,324,078 A | 6/1994 | Bane | |
| 5,365,836 A | 11/1994 | Campbell | |
| 5,413,656 A | 5/1995 | Kuhnhold et al. | |
| 5,496,605 A | 3/1996 | Augst et al. | |
| 5,497,903 A | 3/1996 | Yoneyama | |
| 5,520,308 A | 5/1996 | Berg, Jr. et al. | |
| 5,591,521 A | 1/1997 | Arakawa et al. | |
| 5,623,812 A | 4/1997 | Todt | |
| 5,646,090 A | 7/1997 | Tamura et al. | |
| 5,660,349 A | 8/1997 | Miller et al. | |
| 5,749,466 A | 5/1998 | Seki | |
| 5,885,679 A | 3/1999 | Yasue et al. | |
| 5,979,141 A | 11/1999 | Phillips | |
| 5,979,450 A | 11/1999 | Baker et al. | |
| 6,008,429 A | 12/1999 | Ritger | |
| 6,153,278 A | 11/2000 | Timmerman et al. | |
| 6,263,650 B1 | 7/2001 | Deutsch et al. | |
| 6,295,758 B1 | 10/2001 | Weder et al. | |
| 6,365,254 B1* | 4/2002 | Zoller | B32B 7/06 428/40.1 |
| 6,383,430 B1 | 5/2002 | Johnstone | |
| 6,453,805 B1 | 9/2002 | Viaud et al. | |
| 6,467,719 B1 | 10/2002 | Rodriguez | |
| 6,514,585 B1 | 2/2003 | Pearson et al. | |
| 6,550,633 B2 | 4/2003 | Huang et al. | |
| 6,550,634 B1 | 4/2003 | Alegre De Miquel et al. | |
| 6,632,311 B1 | 10/2003 | Glenna et al. | |
| 6,637,697 B1 | 10/2003 | Wienberg | |
| 6,644,498 B1 | 11/2003 | Lemberger et al. | |
| 6,663,932 B2 | 12/2003 | McLaughlin et al. | |
| 6,685,050 B2 | 2/2004 | Schmidt et al. | |
| 6,756,096 B2 | 6/2004 | Harding | |
| 6,787,209 B2* | 9/2004 | Mass | B65D 65/14 221/48 |
| 6,901,723 B2 | 6/2005 | Jordan et al. | |
| 6,971,542 B2 | 12/2005 | Vogel et al. | |
| 7,165,928 B2 | 1/2007 | Haverdink et al. | |
| 7,541,080 B2* | 6/2009 | Mass | B65D 65/14 229/87.01 |
| 7,625,332 B2 | 12/2009 | Mass et al. | |
| 7,636,987 B2 | 12/2009 | Derscheid et al. | |
| 7,694,491 B2 | 4/2010 | Noonan et al. | |
| 8,071,196 B2 | 12/2011 | Goering | |
| 8,709,565 B2 | 4/2014 | Kalwara et al. | |
| 10,239,278 B2 | 3/2019 | Castillo et al. | |
| 10,257,986 B1 | 4/2019 | Porter et al. | |
| 10,286,625 B2 | 5/2019 | Castillo et al. | |
| 2001/0003617 A1 | 6/2001 | Storbeck et al. | |
| 2002/0172792 A1 | 11/2002 | Jarvis et al. | |
| 2002/0182367 A1 | 12/2002 | Salzsauler et al. | |
| 2003/0000934 A1 | 1/2003 | Tanaka et al. | |
| 2004/0121103 A1 | 6/2004 | Mass et al. | |
| 2004/0121108 A1 | 6/2004 | Mass et al. | |
| 2004/0151853 A1 | 8/2004 | Shirrell et al. | |
| 2005/0034429 A1 | 2/2005 | Mass et al. | |
| 2005/0153083 A1 | 7/2005 | Huang | |
| 2005/0155714 A1 | 7/2005 | Adams | |
| 2006/0101624 A1 | 5/2006 | Derscheid et al. | |
| 2007/0152010 A1 | 7/2007 | Denen et al. | |
| 2007/0240389 A1 | 10/2007 | Frerichs | |
| 2008/0245923 A1 | 10/2008 | Maddaleni et al. | |
| 2009/0107349 A1 | 4/2009 | Noonan et al. | |
| 2009/0226657 A1 | 9/2009 | Thiele | |
| 2009/0274881 A1 | 11/2009 | Mass | |
| 2009/0302147 A1 | 12/2009 | Emoto | |
| 2010/0237179 A1 | 9/2010 | De Matteis | |
| 2011/0133015 A1 | 6/2011 | Gelli et al. | |
| 2011/0309544 A1 | 12/2011 | Hupp et al. | |
| 2011/0311749 A1 | 12/2011 | McNeil | |
| 2012/0148783 A1 | 6/2012 | Kunkleman | |
| 2013/0089690 A1* | 4/2013 | Yao | C09J 7/0296 428/41.8 |
| 2013/0143001 A1 | 6/2013 | Manifold et al. | |
| 2013/0221078 A1 | 8/2013 | Skelton | |
| 2013/0248643 A1 | 9/2013 | Newhouse et al. | |
| 2013/0320124 A1 | 12/2013 | Rochon et al. | |
| 2014/0263590 A1 | 9/2014 | Skelton | |
| 2014/0352263 A1 | 12/2014 | Harchol et al. | |
| 2016/0151994 A1 | 6/2016 | Castillo | |

FOREIGN PATENT DOCUMENTS

| | | |
|---|---|---|
| AU | 2008229852 A1 | 5/2009 |
| AU | 2013902776 | 7/2013 |
| AU | 2008355557 B2 | 9/2013 |
| AU | 2014308544 B2 | 2/2017 |

(56) References Cited

FOREIGN PATENT DOCUMENTS

| CN | 1069281 C | 8/2001 |
|---|---|---|
| CN | 1692062 A | 11/2005 |
| EP | 0942055 | 9/1999 |
| EP | 0942055 A1 | 9/1999 |
| EP | 1584574 A2 | 10/2005 |
| GB | 2233962 A | 1/1991 |
| GB | 2348633 A | 10/2000 |
| JP | 2001019919 A | 1/2001 |
| WO | 9813636 A2 | 4/1998 |
| WO | 99/038930 | 8/1999 |
| WO | 0061359 A2 | 10/2000 |
| WO | 0061359 A3 | 2/2001 |
| WO | 01070497 A2 | 9/2001 |
| WO | 2004031049 A1 | 4/2004 |
| WO | 2004/056671 | 7/2004 |
| WO | 2015010151 A1 | 1/2015 |

OTHER PUBLICATIONS

International Search Report, PCT International Application No. PCT/AU2013/001352, PCT/ISA/210, dated Feb. 11, 2014.
20180423 SA Declaration in Reply (14616711) filed on Apr. 23, 2018, pp. 1-10.
Confidentiality Agreement Between Dominion Tapes Pty Ltd. And Integrated Packaging Group Pty Ltd. dated Apr. 18, 2013, pp. 1-8.
Corporate Notebook Extract made public as of the date of filing of the Statement of Grounds and Particulars (Aug. 23, 2017), p. 1.
International Search Report and Written Opinion for Application No. PCT/AU2014/000821 dated Sep. 26, 2014.
P113709AUM—Evidence in Answer (14337889), dated Feb. 19, 2018, pp. 1-95.
Statement of Grounds and Particulars filed Aug. 23, 2017, pp. 1-5.
Australian Examinarion Report for Application No. 2014308544 dated May 2, 2016, 1 page.
Australian Examination Report for Application No. 2017203044 dated Jul. 30, 2018, 1 page.
Chinese Search Report for Application No. 2013800798640 dated Mar. 15, 2018, 2 pages.
Chinese Search Report for Application No. 201480039097.5 dated May 31, 2017, 2 pages.
Brazilian Search Report including Written Opinion for Application No. BR112016003370-1, dated Jul. 19, 2019, pp. 1-4.
European Search Report for Application No. EP13889998 dated May 31, 2017, 1 page.
Porter, et al., U.S. Appl. No. 14/667,574, filed Mar. 24, 2015, titled "Wrapping Materials for Solid Objects".
The United States Patent and Trademark Office: The International Search Report and Written Opinion of the International Searching Authority, or the Declaration; International Search Report and Written Opinion for PCT/US2015/022330; dated Jun. 18, 2015;pp. 1-12; The United States Patent and Trademark Office; U.S.
The United States Patent and Trademark Office; The International Search Report and the Written Opinion of the International Searching Authority, or the Declaration; PCT/US17/53748 Search Report; dated Feb. 9, 2018; pp. 1-16; United States PatentOffice; US.

* cited by examiner

WRAPPING WEB ASSEMBLY AND WRAPPING METHOD

CROSS-REFERENCE TO RELATED APPLICATIONS

This application is a national stage application of International Patent Application No. PCT/AU2013/001352, filed Nov. 25, 2013, which claims priority to Australian Application Number 2013902776, filed Jul. 26, 2013, the disclosures of each of which are incorporated herein by reference in their entirety, including any figures, tables, and drawings.

FIELD OF THE INVENTION

This invention relates to a wrapping web assembly and a wrapping method employing same. This invention has particular application to a wrapping film assembly and method for field-baling cotton, and for illustrative purposes the invention will be described with reference to this application. However we envisage that this invention may find use in other applications such as wrapping pallets, rolls of goods and other like applications.

BACKGROUND OF THE INVENTION

The reference to any prior art in this specification is not, and should not be taken as, an acknowledgement or any form of suggestion that the referenced prior art forms part of the common general knowledge in Australia.

AU2003292463 (B2) discloses a method and material for wrapping items using a wrapping material made up of separate wrapping portions of a predetermined length. The wrapping portions are attached and released at their ends using a Z-lock system. The Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle.

The essential features of the wrapping material are a plurality of first wrapping portions, a plurality of second wrapping portions, at least one of said plurality of first wrapping portions and at least one of said plurality of second wrapping portions bonded at their respective lateral ends to form at least one bonded wrapping segment, at least one laminate portion capable of holding together and subsequently releasing said at least one of said plurality of first wrapping portions and said at least one of said plurality of said second wrapping portions during a wrapping cycle, wherein a plurality of bonded wrapping segments together form a continuous roll of wrapping material.

AU2005300259 (B2) discloses a method and material for wrapping items using a wrapping material made up of separate wrapping portions of a predetermined length. The wrapping portions are attached and released at their ends using a Z-lock system including a discrete laminate. The discrete laminate of the Z-lock system holds the wrapping portions together during manufacturing but can also easily release or separate the wrapping portions at a desired point in the wrapping process. The separating of the wrapping portions exposes an adhesive that is use to securely bond at least one wrapping portion to the item being wrapped at the end of a wrapping cycle.

The essential features of the invention were a wrapping material comprising a first wrapping portion having a first end and an opposite second end, a second wrapping portion having a first end and an opposite second end that correspond to the first end and opposite second end of said first wrapping portion, a discrete laminate comprising a substrate having a first portion and a second portion, each of said first and second portions having an adhesive thereon, said first portion of said discrete laminate forming a permanent bond between said first end of said first wrapping portion and said second portion of said discrete laminate forming a releasable bond between said opposite second end of said second wrapping portion for holding together said first and second wrapping portions thereby forming a continuous wrapping material, when an item is being wrapped with said continuous wrapping material, said first wrapping portion is released from said second wrapping portion via said releasable bond between said second portion of said laminate and said opposite second end of said second wrapping portion, and one of said first end of said first wrapping portion, said second end of said second wrapping portion, or said discrete laminate is folded back on itself.

Another aspect differs in having a plurality of wrapping portions each having a first end and an opposite second end.

A further aspect has a right wrapping portion having a first end folded back on itself to form a V-shaped fold and an opposite second end and a left wrapping portion having a first end and an opposite second end that, overlaps a portion of said V-shaped fold of said first end of said first wrapping portion, the discrete laminate in this case having its first portion permanently adhered to a surface of the V-shaped fold and its second portion releasably adhered to a surface of the opposite second end of the left wrapping portion so as to form a continuous web of wrapping material that releases said right wrapping portion from said continuous web of wrapping material during a wrapping cycle, and when an item is being wrapped with said right wrapping portion during the wrapping cycle, said second portion of said discrete laminate releases from said respective opposite second end of said left wrapping portion In a yet further aspect there is provided a wrapping material comprising a right wrapping portion having a first end and an opposite second end, a left wrapping portion having a first end and an opposite second end folded back on itself to form a V-shaped fold and said first end of said right wrapping portion overlaps only a portion of said V-shaped fold, and a discrete laminate comprising a substrate having a first portion and a second portion, each of said first and second portions having an adhesive layer thereon, said adhesive layer facing said right and left wrapping portions, said first portion of said discrete laminate being releasably adhered over an upper surface of said V-shaped fold and said second portion of said discrete laminate being permanently adhered to an upper surface of said first end of said right wrapping portion so as to form a continuous web of wrapping material that releases said first and second portions during a wrapping cycle, and when an item is being wrapped with said right wrapping portion during the wrapping.

A principal disadvantage of such constructs is the need to assemble the continuous web from elements of predetermined, length, rather than produce the film as a continuous web.

SUMMARY OF THE INVENTION

In one aspect the present invention resides broadly in a wrapping web assembly including:
a substantially continuous web of a wrapping material; and a plurality of elongate tape assemblies located substantially transversely on and in spaced relation along said web, each said tape assembly comprising an adhesive tape portion adhered to one surface of said web and having a release surface, and a double sided adhesive tape portion releasably adhered to said release surface and adapted to adhere to the other surface of said web as it is spooled about an axis transverse its substantially continuous direction to form a roll.

The substantially continuous web may comprise a polyolefin or copolymer film, woven or non-woven material, netting or the like. For cotton baling the substantially continuous web may comprise polyethylene (PE) or other suitable polymeric material. Typically a PE wrapping film for cotton baling purposes is between 20 to 120 microns thick and 0.5 to 4.0 m in width. The film is selected to have a combination of plastic and elastic deformation to bale cotton cylindrically under tension. The baling film may be transparent or opaque.

In the elongate tape assemblies, the adhesive tape portion may have any number of physical layers to impart the desired properties of having a bonding surface adhering to the web and a release surface against which the double sided adhesive tape portion is releasably adhered. The adhesive tape portion may comprise a paper, polyolefin, polyester, fabric or other tape body having one surface coated with a contact or pressure sensitive adhesive layer and the other surface coated or finished in a release surface. The tape body does not have a high specification requirement and thus may be paper or standard PE film.

For example, the adhesive tape portion may comprise a polyethylene tape having a siliconized release coating adjacent the double sided adhesive tape portion and a synthetic rubber adhesive layer.

The adhesive side of the adhesive tape portion may be any suitable adhesive as would be apparent to a person skilled in the art; the adhesive in use must only resist peeling forces in competition with the release surface and it is not necessary to optimise the adhesive for sheer. In addition it is not necessary that the adhesive be particularly high tenacity or high tack. For example, economical rubber based adhesive will suffice. The release surface may for example include a low surface energy polymer coating such as selected polyolefin or poly(haloalkene) polymer such as polytetrafluoroethylene and/or an applied treatment such as a silicone coating.

The double sided adhesive tape portion may take any form consistent with high coherence in adhesion to the web of an exposed adhesive surface on spooling of the web, good release properties from the release surface of the adhesive tape portion as the spooled web is unrolled, and good sheer strength of the adhesion of the released adhesive layer to the web on wrapping of an article. The double sided adhesive tape portion is in its nature a relatively high wet-grab double-sided tape. The double sided adhesive tape portion may comprise any number of physical layers to provide the properties of a tape carrier body having adhesive on both major surfaces of the tape.

The unspooling action produces a peeling action permitting separation of the adhesive tape portion and double sided adhesive tape portion, leaving the now-redundant adhesive tape portion secured to the web and presenting only its release surface, while the attached double sided adhesive tape portion exposes a high wet-grab contact or pressure sensitive adhesive surface. This exposed adhesive surface is thus substantially uncontaminated and available to close the web about an object to be baled such as a roll of harvested cotton.

In practice it has been found that a degree of resistance to stretching and/or flex is desirable in the double sided adhesive tape portion. This is to enable a fine tuned selection of adhesive properties to allow the freed double sided adhesive tape on unrolling of the rolled web to pass with the web through rollers in the wrapping process. For example it has been found that low stretch films may be selected empirically for the purpose, such as PVC, polyester, and uniaxially- or biaxially-oriented or stereoregular polyolefin or copolymer films may also be used.

At its simplest, the double sided tape laminate is a double-sided adhesive biaxially oriented polypropylene (BOPP) tape such as that marketed by BiesSse® as "221", based on a transparent rigid BOPP tape carrier and high tenacity rubber pressure sensitive adhesive on both sides. The carrier may have the same or different adhesives on each side of the carrier. The BOPP carrier tape is a low-stretch tape and as such may be substituted by any comparable material such as oriented polyvinylchloride (PVC). The rubber adhesive may be substituted by an acrylic adhesive or the like, as would be appreciated by a person skilled in the art.

The tape assembly may be of any width selected to provide a selected sheer strength for the anticipated use, having regard to the selected adhesive layer properties. For example, for cotton baling the tape assembly may be between 150 and 300 mm wide, and typically about 250 mm for BOPP tape double sided with high tenacity rubber pressure sensitive adhesive.

The tape assembly may be provided for attachment to the web as a tape assembly stock. In order to store and deliver the tape assembly stock to an applicator apparatus setting the tape assemblies to the web, the stock may be spooled. The spooled stock may have the exposed adhesive surfaces of the adhesive tape and double sided adhesive tape separated by a single, double sided release film. For example, the respective exposed adhesive surfaces may be separated by a silicone coated film such as transparent silicone coated pattern film.

In a further aspect this invention resides in an elongate tape stock including:
  an adhesive tape portion having a release surface;
  a double sided adhesive tape portion releasably adhered to said release surface; and
  a double sided release film adapted to separate exposed adhesive surfaces of the adhesive tape and the double sided adhesive tape portions when rolled.

As the elongate tape stock is spooled, the double sided release layer closes over the exposed adhesive layer double surfaced release layer, permitting the elongate tape stock to be rolled up for storage and deployment.

The wrapping web assembly of the present invention may be assembled by any process as would be apparent to a person skilled in the art. In a further aspect the invention resides broadly in a method of forming a wrapping web assembly, including the steps of:
  providing a substantially continuous web of a wrapping material;
  providing an elongate tape stock comprising an adhesive tape portion having a release surface, and a double sided adhesive tape portion releasably adhered to said release surface;
  feeding said substantially continuous web of a wrapping material past a laminating station to an accumulator spool adapted to spool said web about an axis transverse its substantially continuous direction;

feeding said elongate tape stock to said laminating station and cutting the elongate tape stock into discrete tape assemblies;

adhering said discrete tape assemblies substantially transversely in spaced relation on one surface of said web; and spooling said web to said accumulator spool whereby an exposed adhesive layer of the tape assembly adheres in the spool to the other surface of the web.

For example the substantially continuous web of a wrapping material may pass from a source spool to a delivery spool, exposing a running web surface. The elongate tape assembly may be provided as a spooled tape stock wherein a double sided release film is adapted to separate exposed adhesive surfaces of the adhesive tape and the double sided adhesive tape portions when rolled. A spool of the elongate tape stock may be fed via a release film stripper assembly to an applicator assembly adapted to shuttle across the face of the web to deploy the tape assembly and cut it to length, and roll back to engage the tape assembly with the web. The process may be made substantially continuous by mounting the applicator assembly slidably on a transversely-reciprocating beam. In this arrangement the relative speed of the web and applicator are the same at least for the engagement phase.

The spacing of the elongate tape assemblies along the web may be selected having regard to the size of the article to be wrapped. For example, for wrapping by rotation of the item to be wrapped or winding of the wrapping web assembly about the object, the spacing is selected such that the adhesive surface exposed by separation of the first and second tape laminate portions self-adheres to the overlap of web about the wrapped article.

When baling cotton, the diameter of a roll of cotton is approximately 2.4 metres and standard practice has 3 complete wraps of the cotton bale made with the green PE baling film, which calculates as 22 metres of wrap when wrapped. In practice, with baling tension in the film, 21 lineal metres (approx.) of spooled product is required.

Accordingly, the tape laminate assemblies may be laid every 21 metres on the green baling poly film, and the green baling poly film may be perforated across the width of the web adjacent to the tape laminate position. There are generally 24 applications, of 21 lineal metres each (24 applications×21 lineal metres=504 lineal metres) comprising 1 roll which may be set inside a cotton harvester.

The tape laminate is applied parallel to the perforation, offset slightly from the perforation, for example, by a few millimetres. This is so when the final wrap is performed and the tape sandwich is holding down that final layer, the edge of the tape sandwich is as close to the edge of the perforation as possible to prevent any extended lip of the film 'lifting away' because of wind, dust, water penetration or the like.

The spooled wrapping web assembly may be delivered to and integrated with machinery such as a cotton harvester having a wrapping mechanism such as that described in AU2003292463 and AU2005300259. In this application the wrapping web assembly tension-wraps the nascent bale, the tension being selected having regard to both the sheer strength of the adhesive bond and the plastic/elastic properties of the web.

As the unspooled web exposes the adhesive surface, the baling equipment film laying rollers must either act on the obverse surface of the web relative to the adhesive surface side, or must include rollers of low surface energy, that is, of substantially non-stick character.

BRIEF DESCRIPTION OF THE DRAWINGS

The invention will be described with reference to the following non-limiting embodiment of the invention as illustrated in the drawings and wherein:

In FIGS. 1 and 2 there is illustrated the formation of a wrapping web assembly from a green polyethylene baling web 11. Adhered along the baling web 11 are transverse, 250 mm-wide elongate tape assemblies 12 on a 21-metre spacing and which have been released from a supply spool (not shown) by separation from a double sided release film 13 and cutting to length. The tape assemblies 12 comprise a double sided adhesive tape portion 14 adhered to the baling web 11 and an adhesive tape laminate portion 15 having a release surface overlying the double sided adhesive tape portion 14.

Figure 1:
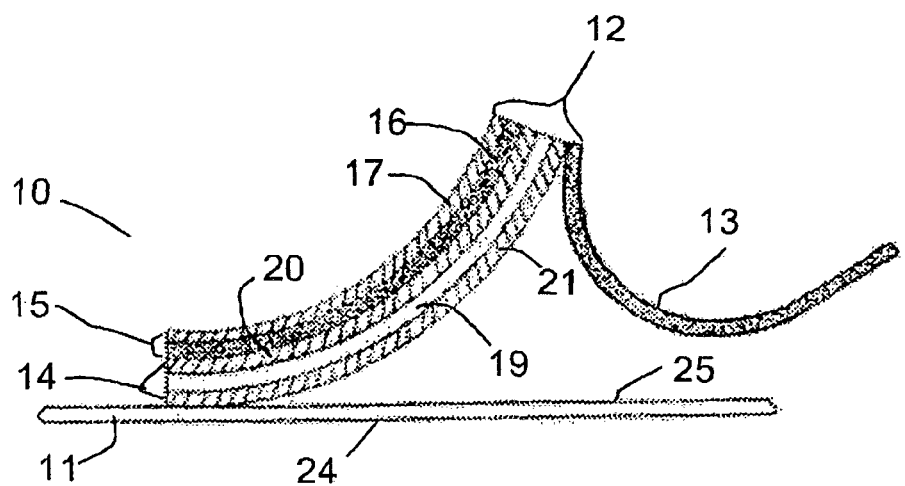
FIG. 1 is a diagram of the act of assembly of a wrapping web assembly in accordance with the present invention.

The adhesive tape portion 15 comprises a white polyethylene tape 16 having a siliconized release coating adjacent the double sided adhesive tape portion and a synthetic rubber adhesive layer 17. The release coating is not a layer per se but in instead a thin coating modifying the surface energy of the polyethylene tape 16.

The double sided adhesive tape portion 14 comprises a BiesSse® 221 BOPP carrier tape 19 having rubber-based adhesive layer 20 overlying said release coating and an exposed rubber-based adhesive layer 21.

The elongate tape assemblies 12 are laid up at the said about 21-metre spaced relation on the front surface 25 of the bailing web 11 as it passes from a supply spool 22 to an accumulator spool 23. The spacing is selected having regard to what is being wrapped. In the present case the spacing is selected to poly bale cotton. The elongate tape assemblies are adjacent perforations 26 defining discrete tear-off locations, whereby there is little tendency for wind, dust, water penetration or the like tending to unbale the cotton.

Figure 2:
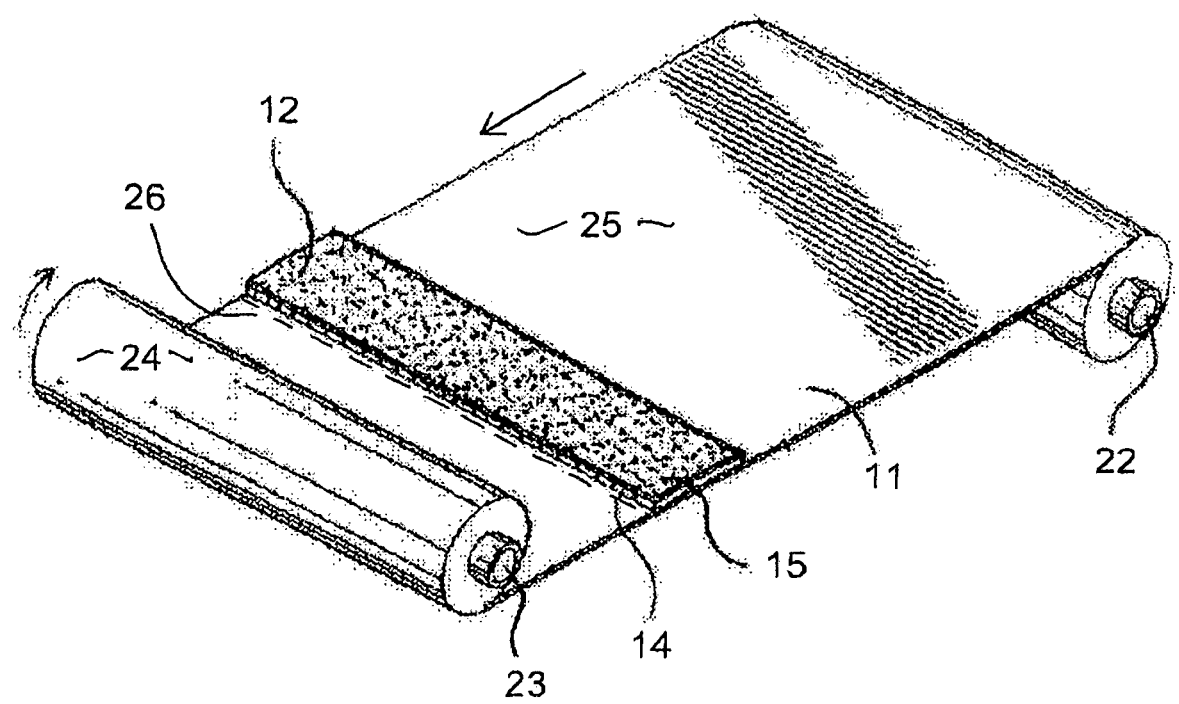
FIG. 2 is a perspective view of the apparatus of FIG. 1, after application of the tape laminate assembly and being rolled up to form the deployable form of the invention.

The exposed adhesive layer 17 of the adhesive tape 15 means that, when the bailing web 11 is rolled up after application of the elongate tape assemblies 12, the exposed adhesive layer 17 permanently adheres to the back surface 24 of the bailing web 11. This is best understood with reference to FIG. 2. The rolled up wrapping web assembly 10 on its accumulator spool 23 may then be transhipped to the point of use, in this case to a cotton harvester having integrated field baling equipment.

Figure 3:
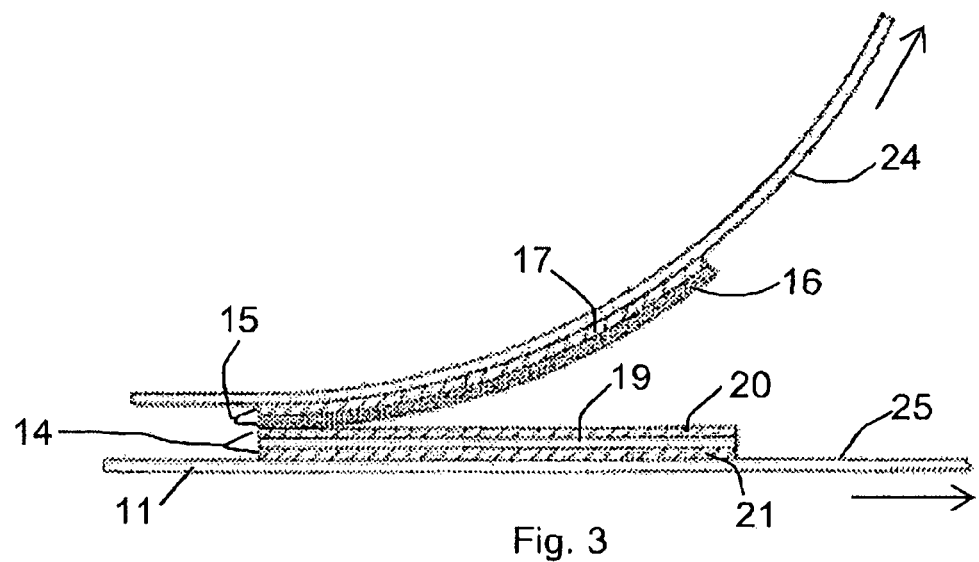
FIG. 3 is a detail view of the mode of tape portion separation of the wrapping web in use.
Figure 4:
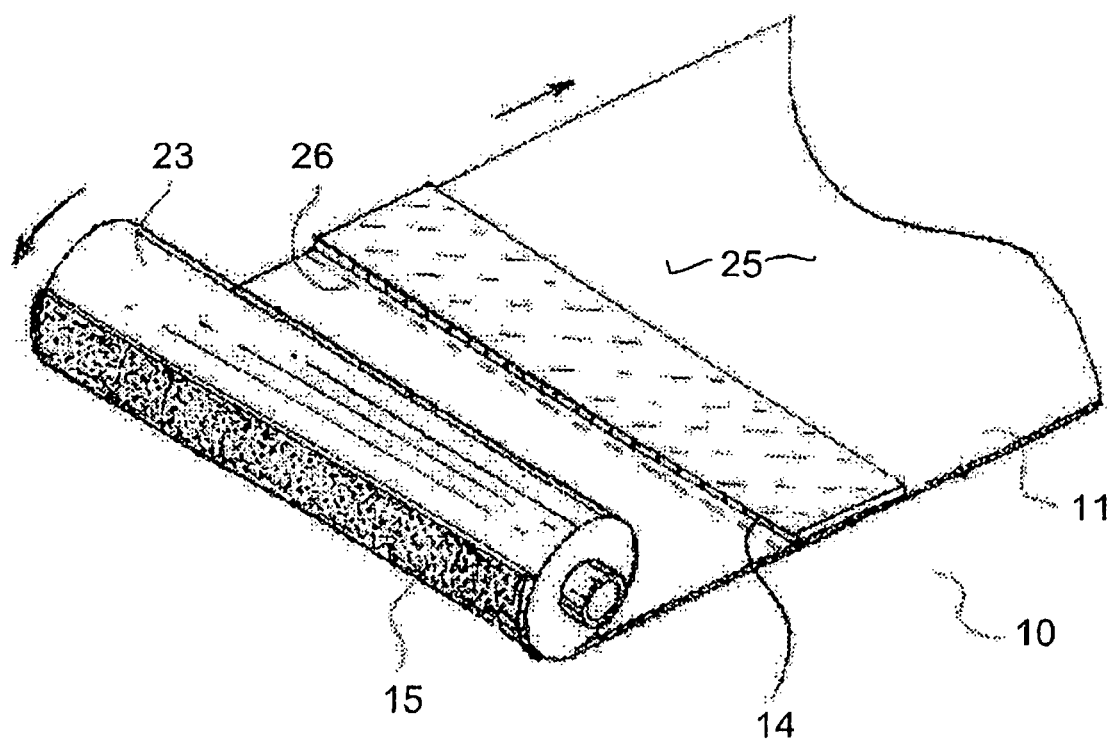
FIG. 4 is a perspective view of the deployment of FIG. 3, inverted for clarity, wherein the web assembly is being deployed for wrapping.

As illustrated in FIG. 3, the wrapping web assembly 10 is deployed by unwinding from the accumulator spool 23 directly into a baling assembly (not shown). The elongate tape assemblies 12 are permanently bonded to the outer 24 and inner 25 surfaces of the bailing web 11 by the synthetic rubber adhesive layer 17 of the adhesive tape portion 14 and adhesive layer 21 of the double sided adhesive tape portion 15.

As the bailing web 11 unspools from the accumulator spool 23, peel forces are applied to the tape assembly 12 at the point where the bailing web 11 leaves the spool 23. This causes separation of the adhesive 15 and double sided adhesive 14 tape portions, with the release coating of the adhesive tape portion 15 peeling away from and exposing the rubber adhesive layer 20 of the double sided adhesive tape portion 4414. The unspooling wrapping web assembly 10 feeds a conventional poly baling machine, with rollers adapted to allow the rubber adhesive layer 20 to pass. The baling machine cuts the trailing portion of the bailing web 11, as the bale is secured by bonding of the exposed rubber adhesive layer 20 to the bailing web 11, by tearing along perforations 26.

Apparatus in accordance with the foregoing embodiment has the advantage of being on a continuous web, avoiding the need to fabricate an assembly of discrete portions. Manufacture is cheaper and field deployment is more reliable.

It will of course be realised that while the above has been given by way of) illustrative example of this invention, all such and other modifications and variations thereto as would be apparent to persons skilled in the art are deemed to fall within the broad scope and ambit of this invention as is set forth in the claims appended hereto.

The invention claimed is:
1. A wrapping web assembly comprising:
   a continuous web of a wrapping material having a first surface on one side of the web and a second surface on the opposite side of the web, the wrapping material including polyethylene (PE); and
   a plurality of elongate tape assemblies located on and in spaced relation along said continuous web of wrapping material, each said tape assembly comprising a double sided adhesive tape portion adhered to the first surface of said web, and an adhesive tape portion having a release surface releasably adhered to said double sided adhesive tape portion, said adhesive tape portion adapted to adhere to the second surface of said web as it is spooled about an axis transverse its substantially continuous direction to form a roll,
   wherein each tape assembly includes, in order from a first adhesive layer of the double sided adhesive tape portion adhered to the first surface of said web, the first adhesive layer, a carrier tape, a second adhesive layer having a rubber adhesive or an acrylic adhesive, the release surface, and a third adhesive layer configured to adhere to the second surface of said web as it is spooled about an axis transverse its substantially continuous direction to form a roll.
2. The wrapping web assembly according to claim 1, wherein the continuous web is from 20 to 120 microns thick and 0.5 to 4.0 meters in width.
3. The wrapping web assembly according to claim 1, wherein the release surface of the adhesive tape portion comprises a paper, polyolefin, polyester, fabric or other tape body having one surface coated with the third adhesive layer and the other surface siliconized and adapted to be releasably adhered to the second adhesive layer.
4. The wrapping web assembly according to claim 3, wherein the adhesive tape portion comprises a polyethylene tape body.
5. The wrapping web assembly according to claim 1, wherein the carrier tape of the double sided adhesive tape portion comprises a low stretch film selected from PVC, polyester, and uniaxially- or biaxially-oriented or stereoregular polyolefin or copolymer films.
6. The wrapping web assembly according to claim 5, wherein the carrier tape of the double sided adhesive tape portion comprises biaxially oriented polypropylene (BOPP) tape.
7. The wrapping web assembly according to claim 1, wherein the tape assembly is between 150 and 300 mm wide.
8. The wrapping web assembly according to claim 1, wherein the double sided adhesive tape portion comprises a carrier double sided with an adhesive layer on each side, each adhesive layer including a rubber adhesive or an acrylic adhesive.
9. The wrapping web assembly according to claim 1, wherein the tape assembly is provided for attachment to the web as a tape assembly stock, wherein the exposed adhesive surfaces of the adhesive tape and double sided adhesive tape are separated in a stock roll by a single, double sided release film.
10. The wrapping web assembly according to claim 1, wherein the continuous web is PE film selected for baling cotton, and wherein the tape assemblies are spaced along said web at a pitch of about 21 metres.
11. The wrapping web assembly according to claim 10, wherein the PE film is perforated adjacent to the elongate tape assemblies.
12. A wrapping web material for wrapping a formed bale of solid material, comprising:
   a continuous wrapping web material of a film, woven, or non-woven material, the wrapping web material including a length and, extending along the length includes a first elongate surface on an upper side of the wrapping web material and a second elongate surface on an opposite lower side of the wrapping web material, the length of the continuous wrapping web material being dividable into portions, each portion having a leading edge and a trailing edge;
   a first adhesive portion adhered at a first location on the first surface of the wrapping web material, the first adhesive portion having an outwardly facing first adhesive surface; and
   a first release surface covering the first adhesive surface, the first release surface including an outwardly facing second adhesive surface covering the first release surface;
   wherein, when the wrapping web material is rolled, the outwardly facing second adhesive surface of the first release surface is configured to adheres to a second location on the second elongate surface of the wrapping web material, the second location positioned at a different longitudinal position along the length than the first location whereby the first location is on a particular portion and is longitudinally closer to an edge of the particular portion than the second location, the second location longitudinally spaced from the edge, such that, when the wrapping material is subsequently unrolled, the first release surface is configured to separate from the first adhesive portion to expose the outwardly facing first adhesive surface of the first adhesive portion.
13. The wrapping web material of claim 12, further comprising a plurality of perforations configured to divide the wrapping web material into portions.
14. The wrapping web material of claim 13, wherein the first location on a particular portion of the wrapping web material is adjacent to the perforation defining a trailing edge of the particular portion.

15. The wrapping web material of claim 14, wherein the particular portion is a first portion and the portion subsequent to the first portion is a second portion whereby the perforation defines the trailing edge of the first portion and a leading edge of the second portion, the second location associated with the first location of the first portion positioned on the second portion.

\* \* \* \* \*